US008650051B2

(12) United States Patent
Jones et al.

(10) Patent No.: US 8,650,051 B2
(45) Date of Patent: Feb. 11, 2014

(54) SYSTEMS AND METHODS FOR INSURANCE VERIFICATION

(75) Inventors: Robert Smith Jones, Columbia, SC (US); Joseph Bradley Harper, Lexington, SC (US); Robert Frederick Motley, Jr., Lexington, SC (US)

(73) Assignee: Coral Building Knowledge, LLC, Columbia, SC (US)

( * ) Notice: Subject to any disclaimer, the term of this patent is extended or adjusted under 35 U.S.C. 154(b) by 48 days.

(21) Appl. No.: 13/297,172

(22) Filed: Nov. 15, 2011

(65) Prior Publication Data

US 2012/0123808 A1 May 17, 2012

Related U.S. Application Data

(60) Provisional application No. 61/414,177, filed on Nov. 16, 2010.

(51) Int. Cl.
*G06Q 10/00* (2012.01)

(52) U.S. Cl.
USPC .............................................. 705/4; 705/1.1

(58) Field of Classification Search
USPC ............................................................ 705/4
See application file for complete search history.

(56) References Cited

U.S. PATENT DOCUMENTS

| 7,283,979 | B2 | 10/2007 | Tulloch et al. | |
| 7,398,220 | B1* | 7/2008 | Hayes | 705/4 |
| 8,346,575 | B2* | 1/2013 | Meagher | 705/3 |
| 2002/0046147 | A1 | 4/2002 | Livesay et al. | |
| 2002/0082863 | A1* | 6/2002 | Kleinke | 705/2 |
| 2002/0169642 | A1* | 11/2002 | Kane et al. | 705/4 |
| 2004/0078246 | A1* | 4/2004 | McCaffrey et al. | 705/4 |
| 2005/0049891 | A1* | 3/2005 | Wilson | 705/1 |
| 2006/0136325 | A1 | 6/2006 | Barry et al. | |
| 2006/0173767 | A1 | 8/2006 | Hansen | |
| 2007/0156461 | A1* | 7/2007 | Carson et al. | 705/4 |
| 2009/0037232 | A1* | 2/2009 | Dubitsky et al. | 705/4 |
| 2009/0192922 | A1 | 7/2009 | Hahn-Carlson | |
| 2010/0169378 | A1* | 7/2010 | Tinberg et al. | 707/781 |
| 2011/0046986 | A1* | 2/2011 | Thomas et al. | 705/4 |
| 2012/0316893 | A1* | 12/2012 | Egawa | 705/2 |

OTHER PUBLICATIONS

CyberDrive Illinois May 13, 2008.*
"Mandatory Insurance," CyberDrive Illinois, May 13, 2008.
ISNetworld Insurance Agent/Broker Tool—Frequently Asked Questions, www.isnetworld.com, Feb. 2010.

* cited by examiner

*Primary Examiner* — William Rankins
(74) *Attorney, Agent, or Firm* — Carr & Ferrell LLP

(57) ABSTRACT

Systems and methods for verifying insurance coverage are provided. A method may include registering data for one or more users, the data including information designating one or more insurance providers for the users. The method may further include transmitting, via a communications network, an insurance verification request to the designated insurance providers, the insurance verification indicating one or more insurance requirements for the user. The communications network may be the internet. A response to the insurance verification request from the designated insurance providers may be received via the communications network. The response may indicate whether insurance associated with the user complies with the one or more insurance requirements. One or more notifications regarding whether the insurance associated with the user complies with the one or more insurance requirements may be transmitted. The insurance verification request may be retransmitted so as to re-verify the user complies with the insurance requirements.

29 Claims, 5 Drawing Sheets

SYSTEMS AND METHODS FOR INSURANCE VERIFICATION

CROSS-REFERENCE TO RELATED APPLICATIONS

The present application claims priority to U.S. Provisional Application No. 61/414,177, filed Nov. 16, 2010, entitled "Insurance Verification System," which is incorporated by reference herein in its entirety.

FIELD OF THE INVENTION

The present disclosure generally relates to a verification system, and more particularly, to systems and methods for verifying insurance.

BACKGROUND

Within the building industry, builders and general contractors generally require that their subcontractors and other service providers provide proof of insurance. In some instances, particularly diligent builders may further require that their subcontractors include language in their respective insurance policies naming the builder as an additional insured. In many instances, it is difficult to ensure that the subcontractor maintains the policy for the length of time and at the level of protection that is required by the builder. Therefore, the builder must trust the contractor to maintain coverage for the length of time required and at the required limits. If a subcontractor fails to pay a premium, for example, its insurance certificate becomes useless in the event of an accident or claim, because the policy would no longer be in force. Similarly, if the contractor adjusts coverage to decrease premium payments, the level of protection will be decreased.

Currently there is no practical or functional way to independently verify that the insurance coverage information submitted by a contractor is accurate or valid. In most instances, the risk management protection is performed via audits and one-time snapshot types of risk management assessments. Audit results become less and less accurate and meaningful each minute that passes after the assessment and verification is made. One of the hurdles to effective risk management via insurance policies is the difficulty in verifying and tracking that a contractor has and maintains the appropriate coverage, the appropriate endorsements naming the builder as an additional insured, that the premium has been paid on time, and that the policy is otherwise in force as expected by the builder. As such, there is a need for improved systems and methods for insurance verification.

Presently there is a need for a verification process to allow a hiring party to verify that an action by a performing party has been performed. The process would allow any user/owner/operator who hires or contracts with any person or entity to provide a good or service that would potentially create liability for the hiring party to verify that an action has occurred. Typically the verification would be for insurance, bonding, or some other form of guarantee that would protect the hiring party from these potential liabilities.

SUMMARY OF THE INVENTION

According to various embodiments, a method is provided for insurance verification. The method may include registering data for one or more users. The data may include information designating one or more insurance providers for the users. The method may further include transmitting, via a communications network, an insurance verification request to the designated insurance providers. The insurance verification request may indicate one or more insurance requirements for the user. The communications network may be the internet. The method may even further include receiving, via the communication network, a response to the insurance verification request from the designated insurance providers. The response may indicate whether insurance associated with the user complies with the one or more insurance requirements. The method may even further include transmitting, via the communication network, one or more notifications regarding whether the insurance associated with the user complies with the one or more insurance requirements. The data for the one or more users may be stored in a memory.

The insurance requirements may include one or more of an insurance coverage amount, an insured coverage period, an endorsement, an indemnification provision, a tax identification number associated with the user, or an insurance coverage description. The insurance verification request may include questions relating to one or more of an insurance coverage amount, an insured coverage period, an endorsement, an indemnification provision, a tax identification number associated with the user, or an insured activities description.

The method may include retransmitting, automatically, the insurance verification request to the designated insurance providers on a recurring basis so as to periodically verify insurance coverage for the user. The recurring basis may be daily, weekly, monthly, or any other predetermined time period. The notifications may be transmitted automatically upon receipt of the response to the insurance verification request. The notifications may be transmitted to a plurality of different entities associated with the user. The method may also include forming a contract (e.g., any legally binding agreement) between the user and a contracting party upon verification of the insurance coverage. The method may provide for cancelling, automatically, the contract between the user and the contracting party when the response to the insurance verification indicates that the user does not comply with the insurance requirements. When the insurance verification response indicates that the user does not comply with the insurance requirements, the response received from the designated insurance provider may include an advertisement providing a quote for insurance for the user complying with the insurance requirements.

According to some embodiments, a system is provided for verifying insurance. The system may include a communications network configured to operate on a communications medium. The communications medium may be the internet. The communications network may be configured to receive data for one or more users, the data including information designating one or more insurance providers for the users. The system may further include a memory configured to store the data and the designated insurance providers. The system may also include a processing system. The processing system may be configured to transmit, via the communications network, an insurance verification request to the designated insurance providers. The insurance verification request may indicate one or more insurance requirements for the user. The processing system may also be configured to receive a response to the insurance verification request from the designated insurance providers. The response may indicate whether insurance associated with the user complies with the one or more insurance requirements.

The processing system may even further be configured to transmit one or more notifications regarding whether the insurance associated with the user complies with the one or more insurance requirements. The insurance requirements may include one or more of an insurance coverage amount, an insured coverage period, an endorsement, an indemnification provision, a tax identification number associated with the user, or an insurance coverage description. The processing system is a web server operating on the internet. Other embodiments may provide for the processing system that is a distributed processing system operating on one or more web servers communicating via the communications network. The processing system may be further configured to automatically retransmit the insurance verification request to the designated insurance provider on a recurring basis. The recurring basis may be daily, weekly, monthly, or a predetermined time period. The data provided by the one or more users may include information identifying a contracting party associated with the user, and further wherein the processing system is further configured to transmit the notifications to the contracting party.

According to even further embodiments, a method is provided for verifying insurance. The method may include registering data received from at least one first user, the data including information identifying one or more second users; transmitting, via a communications network, an information request to the one or more second users, the information request including provisions for the second user to designate one or more insurance providers; receiving, via the communications network, a response to the information request from the second user, the response designating the one or more insurance providers; transmitting, via the communications network, an insurance verification request to the designated insurance providers, the insurance verification request indicating one or more insurance requirements for each of the one or more second users; receiving, via the communication network, a response to the insurance verification request from the insurance provider, the response indicating whether insurance associated with the one or more second users complies with the one or more insurance requirements; and transmitting, automatically upon receipt of the response from the insurance provider, notifications to at least the first user regarding whether the insurance associated with the one or more second users complies with the one or more insurance requirements.

The insurance requirements may include one or more of an insurance coverage amount, an insured coverage period, an endorsement, an indemnification provision, a tax identification number associated with the user, or an insurance coverage description. The method may further include retransmitting, automatically, the insurance verification request to the designated insurance providers on a recurring basis so as to periodically verify insurance coverage for the one or more second users. A contract may be formed between the first user and the second user when the response indicates that the second user complies with the insurance requirements. The method may further include withholding a payment to the second user when the response indicates that the second user does not comply with the insurance requirements.

DETAILED DESCRIPTION OF THE INVENTION

Figure 1:
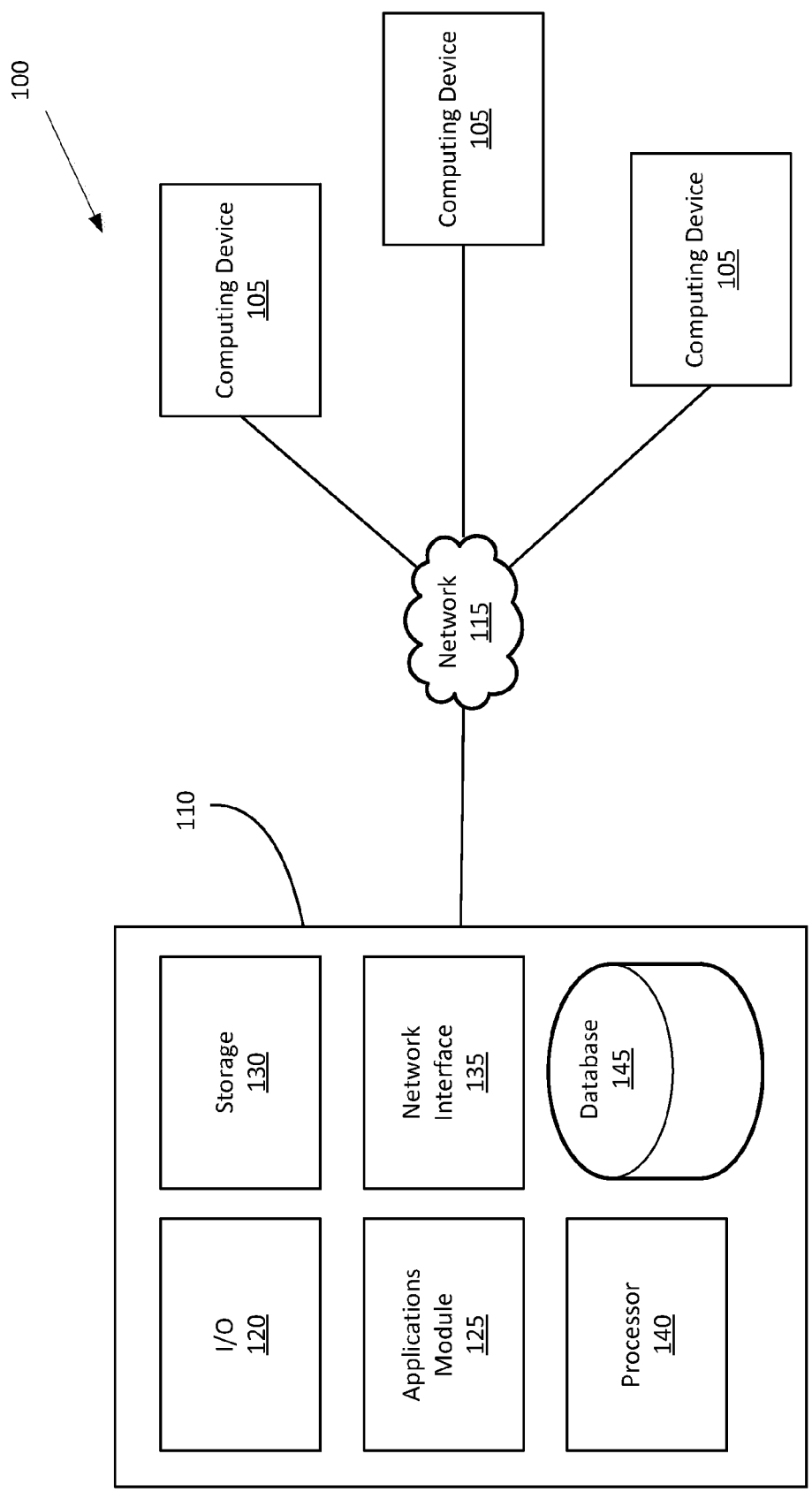
FIG. 1 is a block diagram of an exemplary architecture of a system for practicing aspects of the present technology.

Before explaining the presently disclosed and claimed inventive concept(s) in detail by way of exemplary embodiments, drawings, and appended claims, it is to be understood that the present disclosure is not limited in its application to the details of construction and the arrangement of the components set forth in the following description or illustrated in the drawings. The present disclosure is capable of other embodiments or of being practiced or carried out in various ways. As such, the language used herein is intended to be given the broadest possible scope and meaning; and the embodiments are meant to be exemplary—not exhaustive. It is to be understood that the phraseology and terminology employed herein is for the purpose of description and should not be regarded as limiting. Unless otherwise required by context, singular terms may include pluralities and plural terms may include the singular.

Generally, the systems and methods provided herein may provide for an independent verification process that in some instances can serve to document that something has occurred (i.e., some business event or critical path trigger has been reached or met), that some strategic milestone has been reached, or that a document that may, in many instances, make or imply some warranty, guarantee, endeavor to confirm, etc., is valid, continues to be valid, material, legally in force, and/or legitimate.

The present disclosure may apply to multiple business applications and/or function. In some cases it may occur that the process is configured for various industries such as the insurance verification process for the construction industry, for example, or in other instances a trucking company may need to verify a subcontracted transporters insurance and liability protection. Other adaptations of the current disclosure include, but are not limited to, a company could have an outside sales representative that may be hired to perform off-site sales or delivery services and the company would need to verify that the sales representative has insurance, bonding or any other financial or insurance product. Another example could be a real estate management firm (or property manager) hiring a cleaning service or vendor, wherein the firm wishes to verify that the vendor has obtained, and maintains liability coverage. Financial institutions, municipalities, cities, towns, quasi-governmental agencies, corporations, large service providers (e.g., healthcare service) and services for risk management officers within these organizations could also use the herein disclosed process to independently verify and guarantee that they will be notified if any changes occur to any of these liability protection vehicles. Hiring (or contracting) parties need a practical, reliable and efficient way to verify a performing party has procured the required insurance or other protections and that the coverage remains in place with or without required changes.

Other aspects may provide for the present disclosure to be utilized as a pre-registration information storage/access system. For example, one or more users desiring to be hired or contracted with may register with the system by providing such information as their entity name, tax identification number, their associated insurance provider, etc., wherein the system can then verify the coverage or other protections maintained by the users. This information (i.e., insurance about the registered users and their associated coverage particulars) may then be made available to a, or a plurality of hiring parties, either as a public information source or as a private information storage system that requires the registration and/or authorization by the hiring party. Provisions may be included wherein the pre-registered users determine which hiring parties may be allowed to view their associated information. Such aspects may permit the hiring party to generate a list of users having insurance coverage or other protection vehicles in place and meeting predetermined insurance requirements. Users complying with such insurance requirements may then be selected by the hiring party who then may submit a request for a quotation only from such users.

Other aspects may provide for notifications being provided when the insurance coverage has been verified. The notifications may be provided via a communications system, i.e., the notifications may be provided via the Internet, as an SMS, MMS, or email, as a fax, automated telephone call, etc. The notifications may also be provided via posting to a profile (public or private) for viewing, such as in the pre-registration system discussed above. The notifications may be provided or otherwise transmitted automatically when the insurance coverage is verified.

In addition to the notification system, the system may also provide for notifying each hiring party every time a performing party verifies their policy for another hiring party. That is, all parties who are primary or additional to the policy or verified information item will get another confirmation or notification that the policy, information, or item they are party to is still valid. Such automatic re-notification system statistically and materially improves the risk management assessments and policies of hiring parties.

In some instances the system provides for a property owner to verify property insurance protection is in place to satisfy a requirement of a lien holder. The present technology may be applied to any collateralized asset to verify protection of the lien or title holder's collateral. In some instances the system will automatically notify an insurance agent to add a new building start to the builder's policy. These verifications may be customized to meet the needs of various types of financial institutions. In some instances this may embody the verification of specific policy terms, not just that there is a policy. In some variations this may include the posting of the entire policy. The system may also allow policy holders to determine what parties have access to these policies.

Other aspects may provide builders and other users with policy management tools that allow access to the full insurance policy. This may be available alone or in coordination with the policy verification. Providing the full policy may provide clarity of the policy terms. In some instances this may be used to mitigate the risk of the falsified verifications. Such features may also clarify the responsibility that may or may not be combined with the services of contracting management and scope of work management.

As discussed above, builders and general contractors generally require that their subcontractors and other service providers provide proof of insurance. In some instances, particularly diligent builders may further require that their subcontractors include language in their respective insurance policies naming the builder as an additional insured. In many instances, it is difficult to ensure that the subcontractor maintains the policy for the length of time and at the level of protection that is required by the builder. Therefore, the builder must trust the contractor to maintain coverage for the length of time required and at the required limits. If a subcontractor fails to pay a premium, for example, its insurance certificate becomes useless in the event of an accident or claim, because the policy would no longer be in force. Similarly, if the contractor adjusts coverage to decrease premium payments, the level of protection will be decreased. The present disclosure may provide a solution for using insurance policies to manage risk. Managing risk may include education, tools, and processes (e.g., I-Verify™) to cover the gaps that currently exist in the manual insurance verification process.

In some embodiments, an existing insurance verification form (e.g., an Association for Cooperative Operations Research and Development form ("ACORD") used in the construction/insurance industry) may be used. Such a form may be circulated through an online community, for example, which may allow for builders to register their subcontractors, who may then receive requests to register their insurance providers (agents). These insurance providers may, in turn, be sent a builder's (user's don't necessarily have to be builders) information, including the builder's insurance requirements, as well as a link to post a completed form. The information in the completed form may be further transmitted to an insurance management system (e.g., associated with the builder, general contractor, user/community member, etc.), which may then track various parameters. Such parameters may include various milestones, important dates, risk loopholes, payment schedule, policy effective dates, and endorsements. The builder may then receive notifications regarding any parameter changes (e.g., if any of milestones are reached) or instances where the subcontractor or subcontractor's designated insurance agent has been non-responsive.

Additional aspects may provide for generation of a customized legal document verifying that the desired insurance coverage is in place, the appropriate parties are named as additional insured's, endorsements are in effect, and subcontractors and insurance agents agree to provide pertinent information regarding any changes. In some instances, the contractors and insurance agents may agree to provide updates in response to automated and/or recurring requests. Such requests may be triggered by various hurdles, loopholes, time periods, or milestones, as may be defined by the builder (such as a request for payment). As such, the builder can track and verify that all of the desired insurance policies are in force for the entire duration of the policy effective dates.

In some embodiments, insurance companies may allow for electronic verification of policies when critical risk gaps approach. Such risk gaps may include, for example, premium payment dates. Insurance companies/carriers may be incentivized to participate due to likely increases (or at least maintenance) in collection of premium payments, as well as increases in the pool of insured's. Audit tools may also be provided for accurately evaluating risk with builders in real-time. Reports may also be generated to show any lapse in coverage during a defined period.

The present disclosure may also provide a tool to assist builders and subcontractors with importing their respective payroll information from various applications, including ADP, Quickbooks, etc. Such an import tool allows for automated generation of required workers compensation premiums based on formulas provided by the various insurance carriers.

Currently, homeowners are rarely provided any warranty package, any information regarding the list of subcontractors involved in building their home, or any insurance information. As such, if a construction defect is discovered, most homeowners may only have insurance information on the builder. Embodiments of the present invention offer builders and homeowners the option of generating or purchasing such a report that provides a list of subcontractors and their insurance information.

In some instances, a designated company or individual with such automated tools may serve as a bonded agent for insurance brokers, thereby taking on the risk of providing the information needed to accurately verify insurance coverage. For example, the comments section of the insurance verification form (e.g., an ACORD form) may allow for insurance agents who choose to take on certain risks on behalf of their high value clients to shift the burden of this to the bonded agent. Risk may further be adjusted through contractual terms to which the insurance vendors agree not to cancel the insurance of these high value clients.

Further included in embodiments of the present invention is an ability to create a loan origination packet that will compile information from various sources. Such information may include the awarded contracts for a house plan, contract amounts, vendor and/or trade contractor information, proof of insurance, copies of the plans, bank/appraiser specifications, and other loan information supporting the ability of the builder to fund construction on its own behalf or for the buyer.

Tools may also be provided for verifying loan draws for bank loans. Such tools may compile a list of approved invoices from a designated source and automatically compile a report of the requests, approvals, contract amounts, contract dates, and insurance verifications to send to the bank to request a loan draw.

In some instances it may be necessary to verify the progress towards completion or to verify that some other milestone or critical path trigger has been reached. The process would allow for tracking of this, upload of any digital or scanned documents or pictures supporting the case for or against a satisfactory result, management of these, and distribution of these thru the verification channels. Reporting of this process may in some embodiments' include processes such as schedule tracking and job ready and job complete processes.

In some instances, a supplier may require a builder to sign a personal guarantee or run a credit check prior to agreeing to supply materials or services. In some cases builders or owners may not want to sign these guarantees or allow credit checks. Additionally, in most states mechanic's lien laws allow a subcontractor or supplier to give notice to the builder or owner of their services or materials on a project. In either case, the subcontractor or supplier may choose to provide a notice to owner/notice to contractor/notice of furnishing to the owner or builder. Typically, receipt of these types of notices creates an obligation for the builder and owner to insure payment to the subcontractor or supplier. The invention in some embodiments' will include a feature to allow the builder or owner to be notified in accordance with applicable law and provide contract and scope of work documentation. Some of the resources in this feature may use features of an "Apples-to-Apples"™ platform.

In some instances, embodiments of the present invention may be used to determine various standards for the building market. In the present building market, some insurance agents may be manipulated by large clients into taking on outsized risks. Conversely, the building market should reward an insurance agent who provides quality service in order to generate business. As such, embodiments of the present invention may allow for bonding to reduce risk for the agent provided that the agent perform several routine, basic tasks in exchange. The risk of errors and omissions may be mitigated or eliminated, for example, through electronic verification of policies at each payment run. If a builder does not use an automated system, it may have to invite all of its subcontractors and vendors to physically appear and/or generate an accounts payable run verification list and manually check that all subcontractors required insurance coverage is still valid before making payment. Alternatively, the builder could enter the dates of its accounts payable runs and at a predetermined time frame before the run, the automated system may automatically make verification requests for all policies and generate a list of approved subcontractors and vendors (e.g., for purposes of payroll) for the builder or general contractor so that they can manage exceptions as they see fit. In some instances, insurance agents may push back against verification requests that are sent more often than payment intervals. As such, the builder may configure the system to send an email to the contractor with a link to click on in order to indicate that the contractor wishes to skip verification for a particular pay run. This choice by the subcontractor may be displayed in reports to the general contractor or builder. In exemplary embodiments, such information for subcontractors/vendors may be on one page for easy management, review, and filing.

Loss information could also be verified using a claims information portal may also be provided. Once adopted and integrated with existing data sources, an agent, broker, or insured may authorize (e.g., by signing a release) an automated system to pull up loss information provided by the insurance carrier. For example, general contractor Alpha may require subcontractors having a particular experience level or with a maximum loss ratio. General Contractor Alpha may make incorporate such experience level and loss ration requirements into its insurance requirements. Such requirements would be particularly important to a general contractor who has to meet higher standards than average (e.g., government projects).

Auditing tools may also be provided. A carrier may be offered the ability to easily verify that an insured whose policy requires their sub-contractors to provide proof of insurance coverage have in fact hired sub-contractors who do have the required coverage and have provided proof of it. Insurance certificates may be provided by subcontractors. Further, payroll information may be uploaded from an accounting application (e.g., QuickBooks), by an accountant, or other type of payroll service, allowing the carrier to automatically request and receive verification regarding payroll information and the certificate information. Cash disbursements to subcontractors could be verified and on-site auditing of payables could be eliminated. These checks could run randomly so the carriers can continually monitor and track their exposure and eliminate fraud. Furthermore in some instances they could verify records against tax records. These audits may be customized by carrier to meet their internal needs and requirements. The program could also make it cost effective for carriers who support small businesses to perform audits of payables records that are currently not cost effective. In some variations statistical analysis support could be provided to help locate, find or assess the potential for fraud.

The carrier may also request additional information, such as the number of homes being built this month, so the carrier can run risk models. On the gulf coast, for example, carriers may have to calculate potential risk during hurricane season. It benefits the insured and the carrier if there is a quick and real time audit process. It also takes a lot of the service burden off brokers. Auditing also provides total visibility from the top to the bottom of the entire value chain, as well as frees the brokers to do what they are really hired by the carrier to do: produce more clients.

Such features may further allow for verification of insurance at each payment occurrence for additional insured's. The additional insured may also be notified as to any policy change, cancellation, or modification. As long as the system could double-check on the relevant dates, the system may also be configured to check at a predetermined number of days in advance (e.g., 10 days out, 30 days out). Such systems could then also re-verify along the way to allow coverage if a broker had to put the endorsement on the policy. This can allow the additional insured to be able to make sure the policy never lapses for non-payment. The contractor may have to also be held responsible for not cancelling the policy via an effective contract and lien waiver.

These and other function and implementation details regarding the systems and methods of the presently described and claimed inventive concepts will be described in greater detail below with reference to the FIGS. 1-5.

Referring now to FIG. 1, shown therein is an exemplary architecture of a system 100 which may be adapted to practice aspects of the present disclosure. That is, the exemplary architecture illustrated in FIG. 1 includes hardware, software, and/or combinations thereof, adapted to implement certain aspects of the presently disclosed and claimed inventive concept(s). The exemplary architecture is provided by way of example only and is not intended to be limiting. Changes and variations to the exemplary architecture illustrated in FIG. 1 are considered within the scope of the present disclosure.

A module (or application), as referenced in the present invention, should be generally understood as a collection of routines that perform various system-level functions and may be dynamically loaded and unloaded by hardware and device drivers as required. The modular software components described herein may also be incorporated as part of a larger software platform or integrated as part of an application specific component.

The system 100 illustrated in FIG. 1 includes one or more computing devices 105 (three being shown in FIG. 1 by way of example) coupled to a processing system 110 via a network 115. The system is not limited to three computing devices 105, other numbers of devices may be used. Although FIG. 1 shows one processing system 110 communicating through the network 115 with three computing devices 105, it is to be understood that the system 100 can include more than one processing systems 110 (e.g., more than one server or a distributed server arrangement) communicating with more or less computing devices 105.

Generally, the computing device 105 may be associated with one or more users, e.g., one or more of a client, a builder, a contractor, etc. The computing device 105 may be adapted to permit the user to communicate, or otherwise interface with the processing system 110, via the network 115. The computing device 105 can include component(s), logic instructions, and/or combinations thereof, adapted to permit the user to interface with the processing system 110 to, for example, 1) register data for one or more users, 2) transmit an insurance verification request, 3) receive a response to the insurance verification request, and/or 4) transmit one or more notifications via, for example, the network 115.

The computing device 105 may be adapted to permit the user to interface with the processing system 110 using, for example, a web browser, to transmit/receive data over the network 115. The data for the one or more users may be stored on the processing system 110 rather than being downloaded to the computing device 105. The builders or contractors may access the processing system 110 through and using, for example, a series of web pages accessible via the web browser operating on the computing device 105. The computing device 105 may include components, logic instructions, and/or combinations thereof adapted to record, associate, or otherwise provide user data, insurance coverage details, and the like, to the processing system 110.

In yet another aspect, the computing device 105 can be adapted to permit the builder and/or contractor to interface with the processing system 110 via the network 115 to download the information relating to the user data and/or insurance coverage to the computing device 105 and to then upload or otherwise provide said information to the processing system 110.

The computing device 105 may include any computerized system that can implement a web browser application or other suitable applications adapted to request and provide information to and from the processing system 110 via the network 115. Exemplary systems adapted to implement the computing device 105 include, but are not limited to, a general purpose computing system, a personal computer, a laptop computer, a netbook, a personal digital assistant (PDA), a smart phone, an e-reader, and/or equivalents thereof. Exemplary software applications included on the computing device 105 include a web browser application, a word processor application, a time keeping/tracking application, a communication application, as well as a wide variety of applications understood by one having ordinary skill in the art.

Broadly, the network 115 may be adapted to provide a communications medium to permit the one or more computing devices 105 to communicate with the processing system 110, and vice versa. The network 115 can be implemented via the World Wide Web (WWW), a wide area network (WAN), a local area network (LAN), the Internet, an intranet, a wireless network, a cellular telephone network, and/or equivalents or combinations thereof.

The processing system 110 may include component(s), logic instructions, and/or combinations thereof, adapted to implement at least a portion of the currently described and claimed inventive concept(s). The processing system 110 may include instructions stored on non-transitory computer readable medium that when executed causes the processing system to implement the present technology.

As shown in FIG. 1, the processing system 110 may include an input/output (I/O) module 120, an applications module 125, a storage module 130, a network interface module 135, a processor 140, and one or more databases 145. The I/O module 120 includes hardware, logic, and/or combinations thereof that may permit an administrator to interface, operate, or otherwise control the processing system 110. Exemplary components included as a part of the I/O module 120 may include a keyboard, a mouse, a monitor, a pointing device, a printer, a scanner, and equivalents and/or combinations thereof.

The applications module 125 may include one or more of programs, applications, logic instructions, and computer executable code adapted to operate the processing system 110 as well as to carry out at least a portion of the currently described and claimed inventive concept(s). The storage module 130 may store, for example, the programs and/or applications, operating protocols, and the like, as well as a variety of other processing system 110 parameters, as would be understood in the art. The network interface module 135 may be adapted, or otherwise configured to enable the processing system 110 to communicate via the network 115. The processor 140 may include components, logic instructions, and/or combinations thereof adapted to generally operate the processing system 110.

The database 145 may include, for example, information relating to one or more of user data, insurance requirements, insurance coverage details, etc. Although shown as a single database, the database 145 can be implemented as a plurality of internal or external databases, e.g., a relational database, object database, and the like.

It is to be understood that the description provided above regarding the particularities of the exemplary architecture implementing the processing system 110 is provided by way of example and is not to be considered limiting. The processing system 110 may be implemented as described above or with a variety of modifications and/or changes to the architecture without departing from the particular functions described herein. For example, the processing system 110 may be implemented as a stand-alone server, as a web server, as a distributed server system, as an application server, in combination with a database server, etc. When the processing system 110 is implemented as a webserver, the processing system 110 may communicate with the computing device 105, via the network 115, through a series of web pages. The processing system 110 may be implemented as a single web server or as a distributed processing system including a plurality of server(s) coupled to one or more databases, either locally or remotely.

Figure 2:
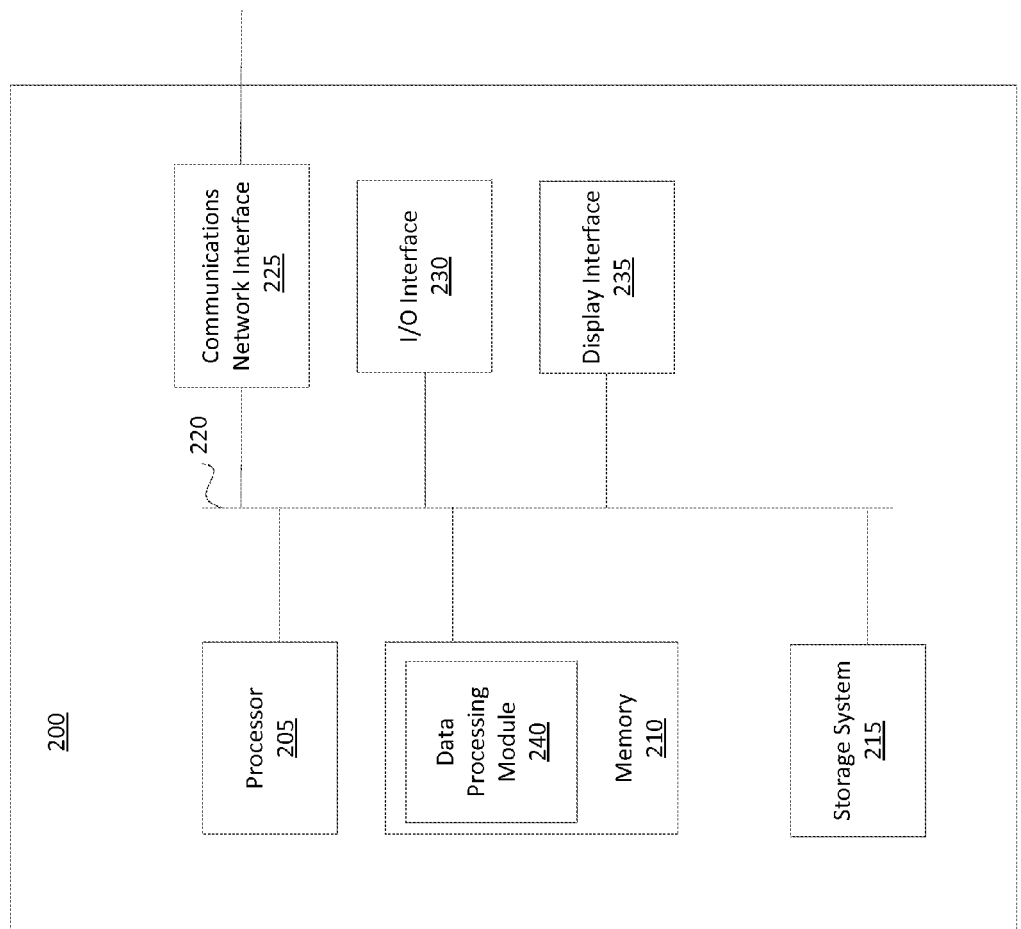
FIG. 2 is a block diagram of an exemplary system for practicing various embodiments.

FIG. 2 is a block diagram of an exemplary system 200. System 200 may be used to implement computing device 105 of FIG. 1. The system 200 may include one or more processors 205 and memory 210. The memory 210 may store, in part, instructions and data for execution by the processor 205. The memory 210 may store executable code when in operation. The memory 210 may include a data processing module 240 for processing data. The system 200 may further include a storage system 215, communication network interface 225, input and output (I/O) interface(s) 230, and display interface 235. The components shown in FIG. 2 are depicted as being communicatively coupled via a bus 220. The components may be communicatively coupled via one or more data transport means. The processor 205 and memory 210 may be communicatively coupled via a local microprocessor bus, and the storage system 215 and display interface 235 may be communicatively coupled via one or more input/output (I/O) buses. The communications network interface 225 may communicate with other digital devices (not shown) via a communications medium.

The storage system 215 may include a mass storage device and portable storage medium drive(s). The mass storage device may be implemented with a magnetic disk drive or an optical disk drive, which may be a non-volatile storage device for storing data and instructions for use by the processor 205. The mass storage device can store system software for implementing embodiments according to the present technology for purposes of loading that software into the memory 210. Some examples of the memory 210 may include RAM and ROM. A portable storage device, as part of the storage system 215, may operate in conjunction with a portable non-volatile storage medium, such as a floppy disk, compact disk or digital video disc (DVD), to input and output data and code to and from the system 200 of FIG. 2. System software for implementing various embodiments may be stored on such a portable medium and input to the system 200 via the portable storage device. The memory and storage system of the system 200 may include a non-transitory computer-readable storage medium having stored thereon instructions executable by a processor to perform, at least partially, a method for verifying insurance. The instructions may include software used to implement modules discussed herein, and other modules.

I/O interfaces 230 may provide a portion of a user interface, receive audio input, and provide audio output. The I/O interfaces 230 may include an alpha-numeric keypad, such as a keyboard, for inputting alpha-numeric and other information, or a pointing device, such as a mouse, trackball, stylus, or cursor direction keys. The display interface 235 may include a liquid crystal display (LCD) or other suitable display device. The display interface 235 may receive textual and graphical information, and process the information for output to the display interface 235.

Figure 3:
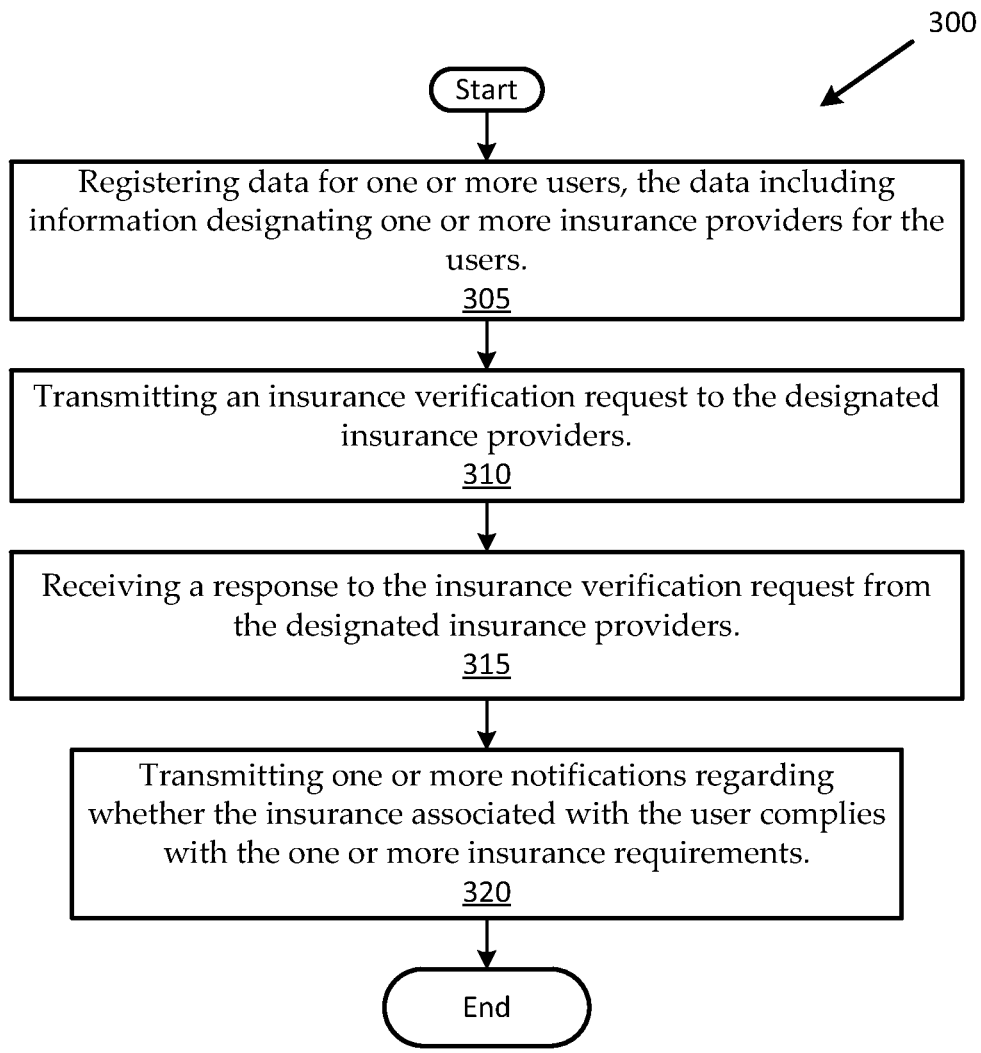
FIG. 3 is a flow diagram showing an exemplary method of verifying insurance.

FIG. 3 is an exemplary flow diagram of a method 300 for verifying insurance. The method 300 may generally provide a method for verifying insurance coverage for one or more users. The method 300 may include a step 305 of registering data for one or more users. The data may include information designating one or more insurance providers for the users. The data may be provided in hard copy form (e.g., paper, fax, an ACORD form, etc.) or the data may be provided electronically via a communications network (e.g., via the network 115 discussed above). The data for the one or more users may be stored in a memory (e.g., the database 145, storage module 130, and/or the storage system 215).

The method 300 may further include a step 310 of transmitting an insurance verification request to the designated insurance providers. The insurance verification request may be transmitted via a communications network. The insurance verification request may include information or otherwise indicate one or more insurance requirements for the user. The insurance verification request may include one or more questions relating to an insurance coverage amount, an insured coverage period, an endorsement, an indemnification provision, a tax identification number associated with the user, or an insured activities description. Additional questions that may be included on the insurance verification request may relate to: (1) the insured's worker's compensation and employer's liability; (2) commercial general liability (e.g., is the contracting party insured on the policy, are there additional endorsements, cross liability coverage, etc.); (3) business automobile liability; and/or (4) umbrella excess liability.

The insurance requirements may include an insurance coverage amount, an insured coverage period, an endorsement, an indemnification provision, a tax identification number associated with the user, or an insurance coverage description. In the case wherein the present disclosure is implemented in the construction industry, exemplary insurance requirements may include "Contractor shall maintain, at its expense, the following insurance coverages: (a) Workers Compensation and Employer's Liability; (b) Commercial General Liability; and (c) Business Automobile liability. The limits and terms of such coverages shall be as set forth on the Certificates of Insurance provided to Builder prior to the execution of the Agreement. Each Certificate of Insurance shall name Builder as certificate holder and shall state that the insurance will not be canceled without thirty (30) days written notice to Builder. If Builder receives notice of cancellation of Contractor's insurance or if Contractor fails to renew its insurance for any reason, then Builder shall have to right to immediately pay the renewal premiums and deduct the costs from any amounts that may be due Contractor."

Various embodiments may also provide for retransmitting the insurance verification request to the designated insurance providers on a recurring basis so as to periodically verify insurance coverage for the user. The insurance verification request may be retransmitted daily, weekly, monthly, annually, on or near an expiration date of the insurance coverage, or any other predetermined time period.

The method 300 may further include a step 315 of receiving a response to the insurance verification request from the designated insurance providers. The response may be received via the communications network. Further, the response may indicate whether insurance associated with the user complies with the one or more insurance requirements. The response may include information indicating whether the user has insurance and, if so, whether the insurance meets the requirements required by a hiring or contracting party. In the instances wherein the user is pre-registering so as to have its insurance coverage particular pre-verified, the response may include information detailing such things as an insurance coverage amount, an insured coverage period, an endorsement, an indemnification provision, a tax identification number associated with the user, or an insurance coverage description, etc. Additional embodiments may provide for, when the insurance verification response indicates that the user does not comply with the insurance requirements, the response received from the designated insurance provider further includes an advertisement providing a quote for insurance for the user complying with the insurance requirements. Such embodiments permit targeted advertising to users which is mutually beneficial to the users as well as the insurance providers. The advertisement may include a mechanism (e.g., a link, a radial button, etc.) wherein the user or hiring party can quickly and easily select the insurance coverage provided in the advertisement so as to thereby comply with the insurance requirements. The hiring party may then deduct any premium paid for insuring the user so as to be reimbursed.

The method 300 may further include a step 320 of transmitting one or more notifications regarding whether the insurance associated with the user complies with the one or more insurance requirements. The notifications may be transmitted via the communications network (e.g., network 115). The notifications may be transmitted automatically, e.g., upon receipt of the response to the insurance verification request. In some embodiments, the notifications are transmitted to a plurality of different entities associated with the user. When the user is a sub-contractor, the notifications may be transmitted to different builders/general contractors. When the user seeks to obtain or maintain a lien, the notifications may be provided to the lien holder(s). Other aspects may provide for the data provided by the one or more users including information identifying a contracting party associated with the user. The processing system may then be further configured to transmit the notifications to the contracting party identified in the data.

Figure 4:
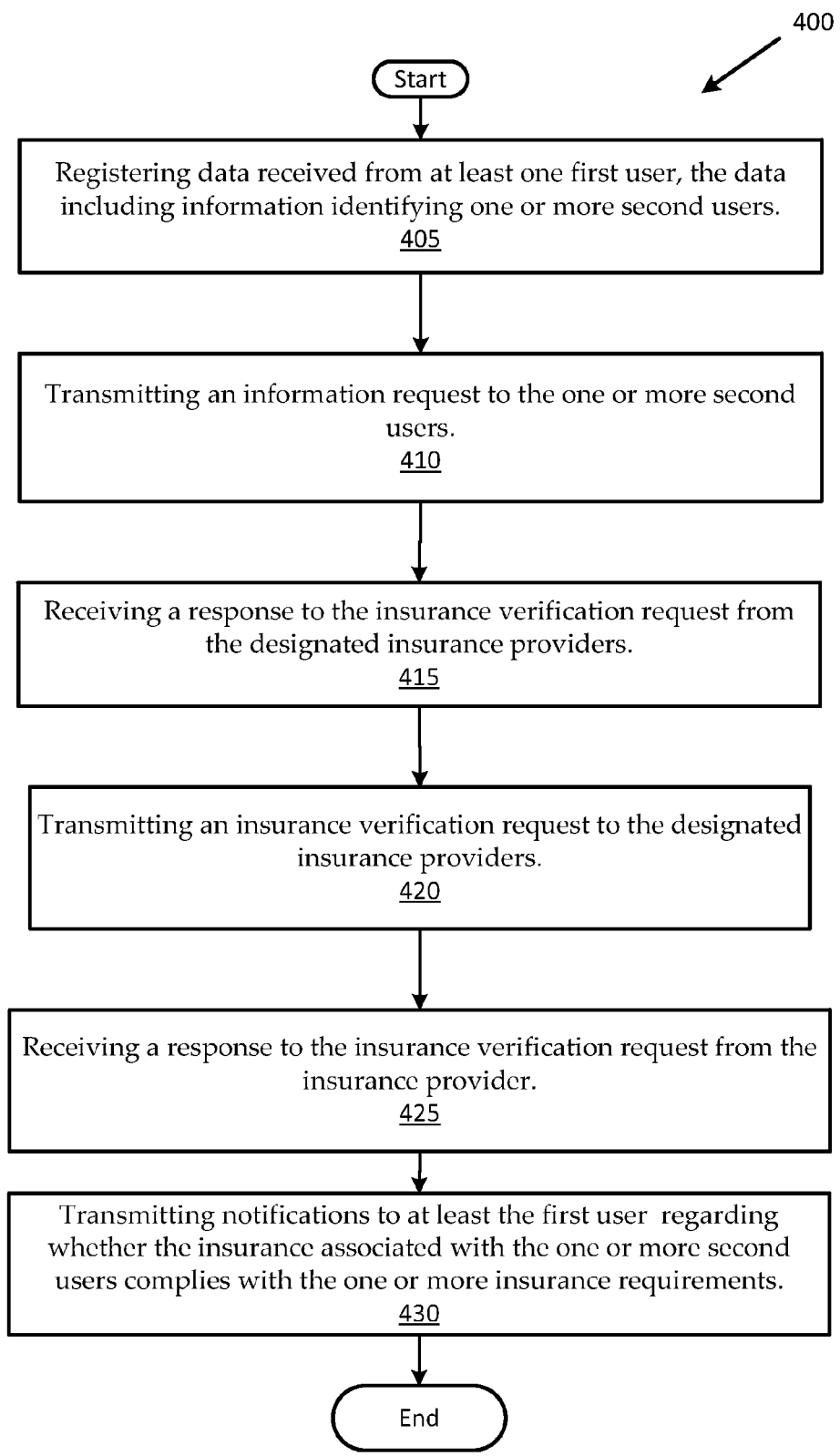
FIG. 4 is a flow diagram showing another exemplary method of verifying insurance.

In some embodiments, a contract may be formed between the user and a contracting or hiring party upon verification of the insurance coverage. That is, when a user and a hiring party have negotiated and agreed to the essential elements of a contract, the contract may be formed upon verification of the user's insurance coverage using the present technology. The contract may be a legally binding document. In some embodiments, such as when the terms of the contract require the contractor to maintain coverage and/or for the coverage to include certain provisions (the insurance requirements), the method 300 may further cancel the contract when the insurance requirements are not maintained by the user. The contract between the user and the contracting party may be cancelled automatically when the response (either an initial response or a response to a recurring insurance verification request) to the insurance verification indicates that the user does not comply with the insurance requirements FIG. 4 is an exemplary flow diagram of another method 400 for verifying insurance. The method 400 may include a step 405 of registering data received from at least one first user. The data may include information identifying one or more second users. Generally, the first user may be a builder, wherein the one or more second users may be contractors the builder desires to contract with or hire. As discussed above though, the present technology may be implemented in a variety of other industries (e.g., financial, marketing, etc.) such that the relationship between the first user and the one or more second users may be different from the contractor/builder example. The data may be received via a communications network (e.g., the internet, Network 115, cellular telephone network, etc.).

The method 400 may include a step 410 of transmitting an information request to the one or more second users. The information request may include provisions for the second user to designate one or more insurance providers. The information request may be transmitted via the communications network. The method 400 may include as step 415 of receiving a response to the information request from the second user. The response may designate the one or more insurance providers. The insurance providers may provide insurance or other liability coverage to the second user. The response may be received via the communications network.

The method 400 may further include a step 420 of transmitting an insurance verification request to the designated insurance providers. The insurance verification request may be transmitted via the communications network. The insurance verification request may indicate one or more insurance requirements for each of the one or more second users. The insurance requirements may include an insurance coverage amount, an insured coverage period, an endorsement, an indemnification provision, a tax identification number associated with the user, or an insurance coverage description. In some embodiments, retransmitting the insurance verification request to the designated insurance providers on a recurring basis so as to periodically verify insurance coverage for the one or more second users may also be provided.

The method 400 may include a step 425 of receiving a response to the insurance verification request from the insurance provider. The response may be received via the communications network. The response may indicate whether insurance associated with the one or more second users complies with the one or more insurance requirements. The response may indicate what the insurance coverage amount, the insured coverage period, the endorsement, the indemnification provision, the tax identification number associated with the user, the insurance coverage description is for the one or more second users, etc.

The method 400 may further include a step 430 of transmitting notifications to at least the first user regarding whether the insurance associated with the one or more second users complies with the one or more insurance requirements. The notifications may be transmitted via the communications network. The notifications may be transmitted automatically upon receipt of the response from the insurance provider. When the response indicates that the second user complies with the insurance requirements, provisions may be provided for forming a contract between the first user and the second user. Further aspects may provide for withholding a payment to the second user when the response to the insurance verification request indicates that the second user does not comply with the insurance requirements. For example, when a contract between the first and second user requires the second user to maintain insurance coverage complying with the insurance requirements, when a response (e.g., a response to a recurring insurance verification request) indicates that the second user has allowed the coverage to lapse, or reduced the coverage amount so as to reduce premium payments, the current disclosure may provide for withholding a payment to the second user. The payment may be withheld automatically upon verification that the second user no longer complies with the insurance requirements. Other aspects may provide for cancelling the contract between the first and second user when the second user does not comply, or fails to maintain compliance with the insurance requirements.

Figure 5:
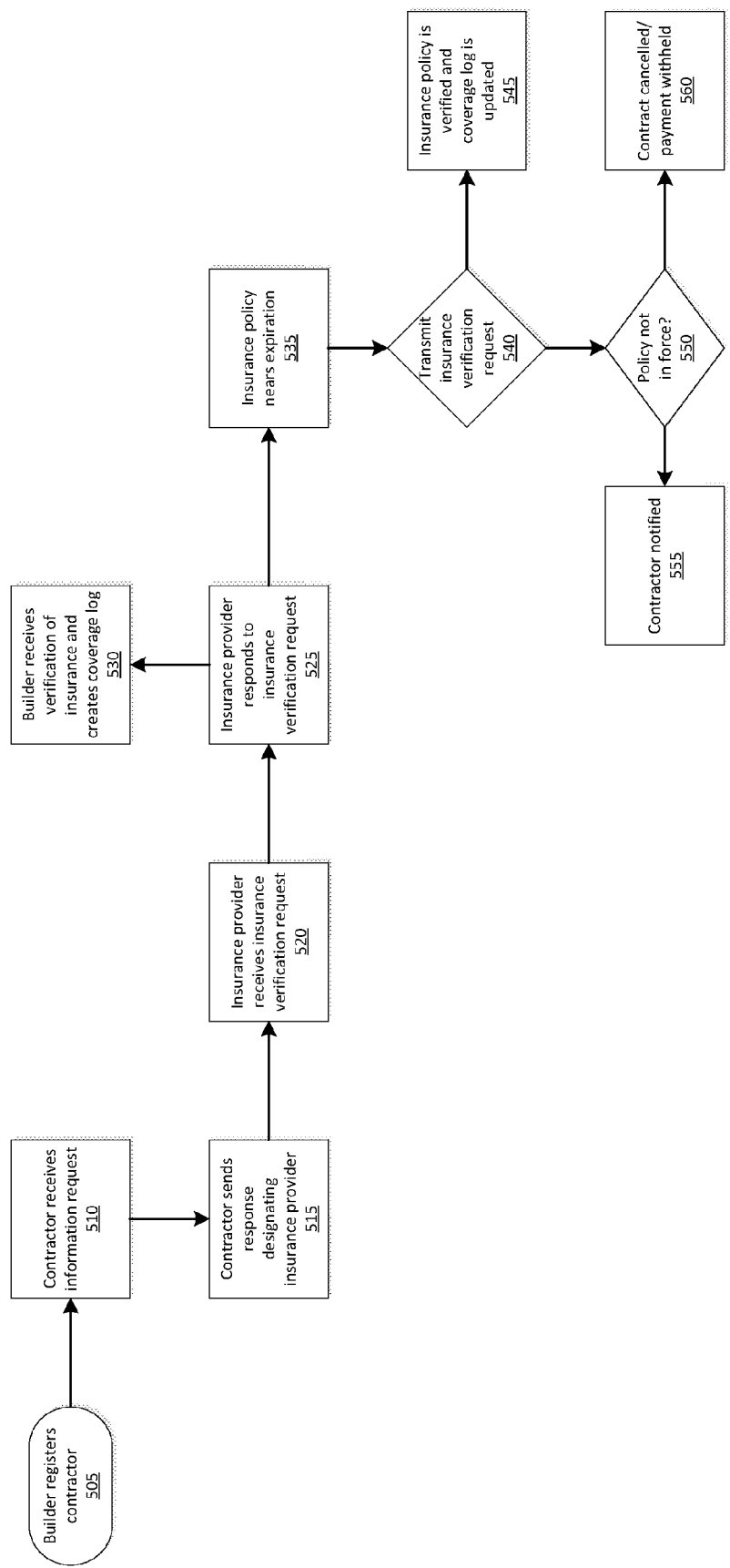
FIG. 5 is a block diagram showing aspects for practicing at least a portion of the present disclosure.

FIG. 5 is a block diagram showing aspects of carrying out at least a portion of the present disclosure. In the diagram shown in FIG. 5, the present disclosure has been adapted to the building industry. However, as discussed above, the present disclosure is not limited to application within the building industry. Generally, a builder may register a contractor with the system at 505. The builder may register data associated with the contractor, e.g., entity name, contact information, tax identification number, etc. The builder may also indicate what the insurance requirements are for the contractor. Exemplary insurance requirements include, but are not limited to, an insurance coverage amount, an insured coverage period, an endorsement, an indemnification provision, a tax identification number associated with the user, or an insurance coverage description. The contractor may receive an information request at 510. The information request may be received as an email, text message, or any other form of electronic communication. The contractor enters information and designates an insurance provider at 515. Some aspects may provide for verifying that the information provided by the contractor matches the information provided by the builder, e.g., ensures the tax identification number and entity name matches. The contractor transmits the response to the information request including the designation of the insurance provider. The insurance provider receives an insurance verification request at 520. The insurance verification request may be received via an email or other electronic communication. Other embodiments may include sending an email having a link, wherein selecting the link, directs the insurance provider to a remote system (e.g., web server) configured to permit the insurance provider to enter the insurance coverage details for the contractor. The insurance verification request may include the insurance requirements for the contractor.

The insurance provider responds to the insurance verification request at 525. If the response indicates that the contractor complies with the insurance requirements, the builder can then be notified to thereby receive verification of the compliance at 530. The builder may create a coverage log for the contractor. In certain embodiments, the insurance coverage period dates may be monitored such that, as the insurance policy nears its expiration date at 535, the system automatically retransmits an insurance verification request to the insurance provider at 540 so as to verify that the insurance policy is still paid up and in force with the insurance provider. If the response indicates that the policy is still in force and/or that the provisions of the policy have not been changes, the builder can then be notified at 545. The builder may then update the coverage log for the contractor. If, however, the response to the insurance verification request indicates that the contractor no longer complies with the insurance requirements at 550, the contractor can be notified at 555 so as to pay the premium or otherwise ensure compliance with the insurance requirements. Additionally, the builder may withhold a payment from the contractor at 560 until the contractor obtains insurance coverage meeting the insurance requirements. The builder may also cancel the contract at 560 if the builder does not ensure compliance with the insurance requirements.

While the present invention has been described in connection with a series of preferred embodiments, these descriptions are not intended to limit the scope of the invention to the particular forms set forth herein. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. The present descriptions are intended to cover such alternatives, modifications, and equivalents as may be included within the spirit and scope of the invention as defined by the appended claims and otherwise appreciated by one of ordinary skill in the art. In several respects, embodiments of the present invention may act to close the loopholes in the current industry practices in which good business practices and logic are lacking because it is not feasible to implement with current resources and tools.

What is claimed is:

1. A computer-implemented method for insurance verification, the method comprising a processor performing:
   registering data for one or more users, the data including information designating one or more insurance providers for the users;
   transmitting, via a communications network, an insurance verification request to the designated insurance providers, the insurance verification request indicating one or more insurance requirements for the user;
   receiving, via the communications network, a response to the insurance verification request from the designated insurance providers, the response indicating whether insurance associated with the user complies with the one or more insurance requirements;
   transmitting, via the communications network, one or more notifications regarding whether the insurance associated with the user complies with the one or more insurance requirements; and wherein the notifications are transmitted to a plurality of different entities associated with the user.

2. The method of claim 1, further comprising storing the data for the one or more users in a memory.

3. The method of claim 1, wherein the insurance requirements include one or more of an insurance coverage amount, an insured coverage period, an endorsement, an indemnification provision, a tax identification number associated with the user, or an insurance coverage description.

4. The method of claim 1, wherein the insurance verification request includes questions relating to one or more of an insurance coverage amount, an insured coverage period, an endorsement, an indemnification provision, a tax identification number associated with the user, or an insured activities description.

5. The method of claim 1, further comprising retransmitting, automatically, the insurance verification request to the designated insurance providers on a recurring basis so as to periodically verify insurance coverage for the user.

6. The method of claim 5, wherein the recurring basis is one or more of daily, weekly, monthly, or a predetermined time period.

7. The method of claim 1, wherein the notifications are transmitted automatically upon receipt of the response to the insurance verification request.

8. The method of claim 1, further comprising forming a contract between the user and a contracting party upon verification of the insurance coverage.

9. The method of claim 8, further comprising cancelling, automatically, the contract between the user and the contracting party when the response to the insurance verification indicates that the user does not comply with the insurance requirements.

10. The method of claim 1, wherein the communications network is the internet.

11. The method of claim 1, wherein, when the insurance verification response indicates that the user does not comply with the insurance requirements, the response received from the designated insurance provider further includes an advertisement providing a quote for insurance for the user that complies with the insurance requirements.

12. A system for verifying insurance, the system comprising:
- a communications network configured to operate on a communications medium and to receive data for one or more users, the data including information designating one or more insurance providers for the users;
- a memory configured to store the data and the designated insurance providers;
- a processing system configured to transmit, via the communications network, an insurance verification request to the designated insurance providers, the insurance verification request indicating one or more insurance requirements for the user, receive a response to the insurance verification request from the designated insurance providers, the response indicating whether insurance associated with the user complies with the one or more insurance requirements, and transmit one or more notifications regarding whether the insurance associated with the user complies with the one or more insurance requirements; and wherein the data provided by the one or more users includes information identifying a contracting party associated with the user, and further wherein the processing system is further configured to transmit the notifications to the contracting party.

13. The system of claim 12, wherein the insurance requirements include one or more of an insurance coverage amount, an insured coverage period, an endorsement, an indemnification provision, a tax identification number associated with the user, or an insurance coverage description.

14. The system of claim 12, wherein the communications medium is the internet.

15. The system of claim 12, wherein the processing system is a web server operating on the internet.

16. The system of claim 12, wherein the processing system is a distributed processing system operating on one or more web servers communicating via the communications network.

17. The system of claim 12, wherein the processing system is further configured to automatically retransmit the insurance verification request to the designated insurance provider on a recurring basis.

18. The system of claim 17, wherein the recurring basis is one or more of daily, weekly, monthly, or a predetermined time period.

19. A computer-implemented method for insurance verification, the method comprising a processor performing:
- registering data for one or more users, the data including information designating one or more insurance providers for the users;
- transmitting, via a communications network, an insurance verification request to the designated insurance providers, the insurance verification request indicating one or more insurance requirements for the user;
- receiving, via the communications network, a response to the insurance verification request from the designated insurance providers, the response indicating whether insurance associated with the user complies with the one or more insurance requirements;
- transmitting, via the communications network, one or more notifications regarding whether the insurance associated with the user complies with the one or more insurance requirements; and
- wherein, when the insurance verification response indicates that the user does not comply with the insurance requirements, the response received from the designated insurance provider further includes an advertisement providing a quote for insurance for the user that complies with the insurance requirements.

20. The method of claim 19, further comprising storing the data for the one or more users in a memory.

21. The method of claim 19, wherein the insurance requirements include one or more of an insurance coverage amount, an insured coverage period, an endorsement, an indemnification provision, a tax identification number associated with the user, or an insurance coverage description.

22. The method of claim 19, wherein the insurance verification request includes questions relating to one or more of an insurance coverage amount, an insured coverage period, an endorsement, an indemnification provision, a tax identification number associated with the user, or an insured activities description.

23. The method of claim 19, further comprising retransmitting, automatically, the insurance verification request to the designated insurance providers on a recurring basis so as to periodically verify insurance coverage for the user.

24. The method of claim 19, wherein the recurring basis is one or more of daily, weekly, monthly, or a predetermined time period.

25. The method of claim 19, wherein the notifications are transmitted automatically upon receipt of the response to the insurance verification request.

26. The method of claim 19, wherein the notifications are transmitted to a plurality of different entities associated with the user.

27. The method of claim 19, further comprising forming a contract between the user and a contracting party upon verification of the insurance coverage.

28. The method of claim 27, further comprising cancelling, automatically, the contract between the user and the contracting party when the response to the insurance verification indicates that the user does not comply with the insurance requirements.

29. The method of claim 19, wherein the communications network is the internet.

* * * * *